United States Patent [19]

Gundry

[11] Patent Number: 4,532,556
[45] Date of Patent: Jul. 30, 1985

[54] TIME-BASE CORRECTION OF AUDIO SIGNALS IN VIDEO TAPE RECORDERS

[75] Inventor: Kenneth J. Gundry, San Francisco, Calif.

[73] Assignee: Dolby Laboratories Licensing Corporation, San Francisco, Calif.

[21] Appl. No.: 496,499

[22] Filed: May 20, 1983

[51] Int. Cl.³ .................... H04N 5/782; H04N 5/95
[52] U.S. Cl. ........................... 360/19.1; 360/36.1; 358/337
[58] Field of Search ............... 358/342, 336, 339, 337, 358/343; 360/36.2, 38.1, 39, 51, 19.1, 36.1; 369/59

[56] References Cited

U.S. PATENT DOCUMENTS 4,005,476 1/1977 Dickopp et al. .................... 360/36
4,345,279 8/1982 Kimura ............................. 360/36.1

Primary Examiner—Robert L. Richardson
Attorney, Agent, or Firm—Majestic, Gallagher Parsons & Siebert

[57] ABSTRACT

The time-base corrector of this invention corrects the time-base of audio signals reproduced from video tapes without correcting the time-base of video signals which are associated with the audio signals. Reference signals such as the horizontal synchronizing pulses which accompany video information are used for correcting the time-base of audio signals if such reference signals have been subjected to substantially the same time compression or expansion as the audio signals. In the preferred embodiment, the reproduced audio signals are sampled and written into a sampled data delay and read out of it by means of a control circuit. The control circuit receives as input the undistorted reference signal and the reproduced reference signal which has undergone time compression or expansion. The control circuit derives a write clock signal with a frequency equal to k times the frequency of the distorted reference signal. The reproduced (and therefore time compressed or expanded) audio signal is sampled and read into the sampled data delay by the write clock signal. The audio signal stored in the sampled data delay is then read by the control circuit at a frequency of a read clock signal with a frequency equal to k times the frequency of the undistorted reference signal. The audio signal read in the above manner will be time-base corrected.

10 Claims, 15 Drawing Figures

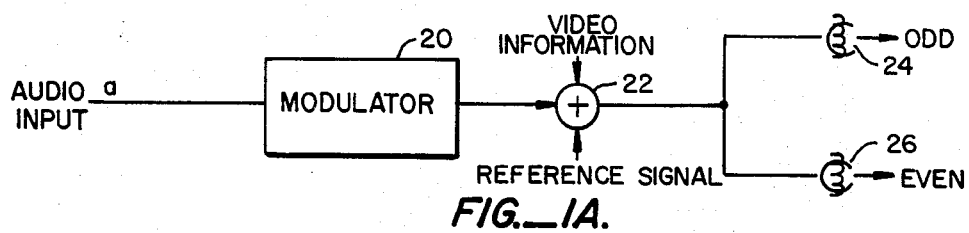
FIG._1A.
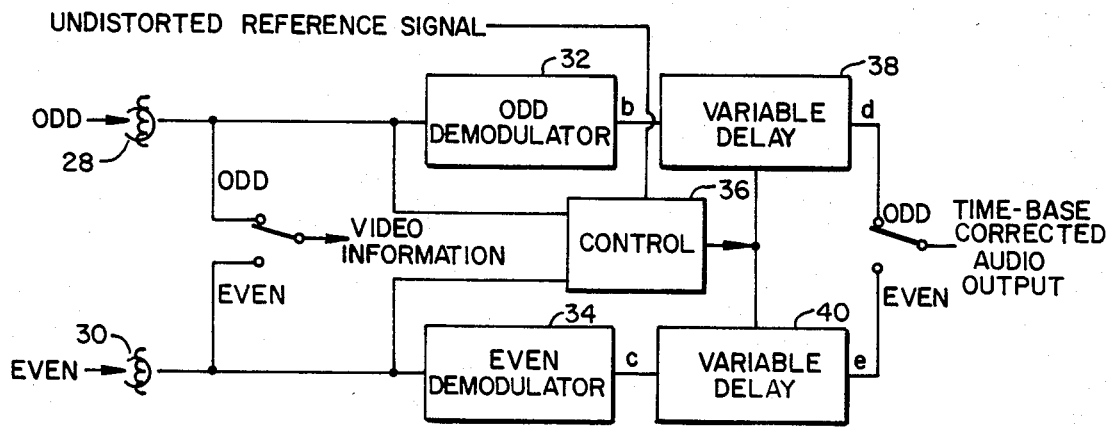
FIG._1B.
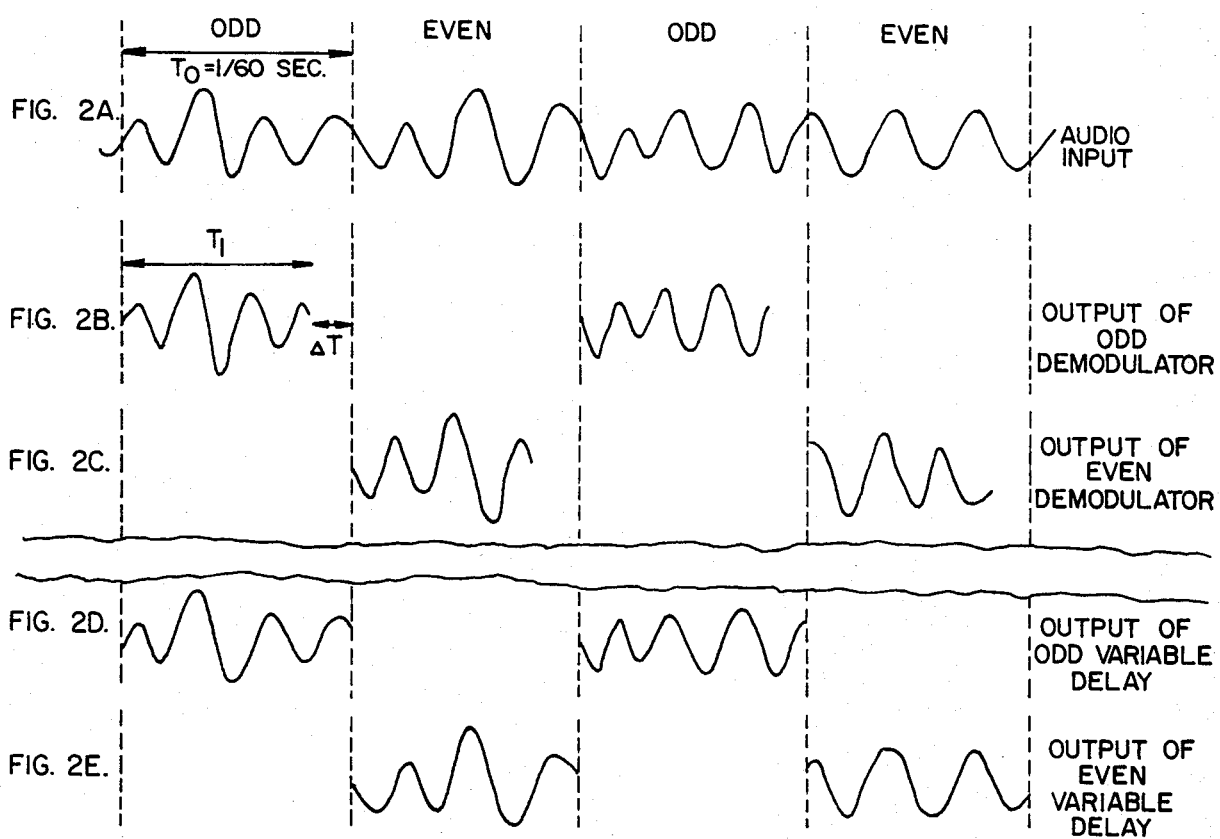

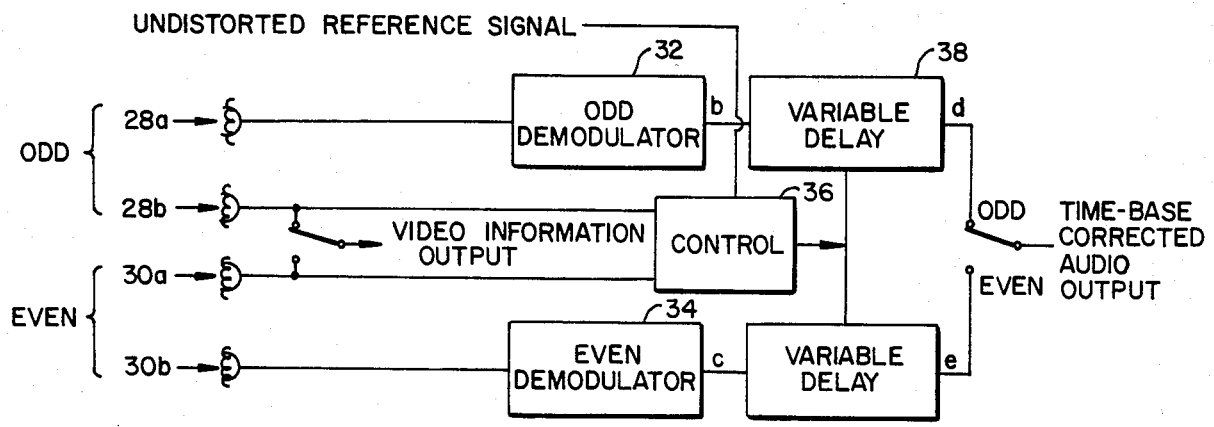
FIG._1C.
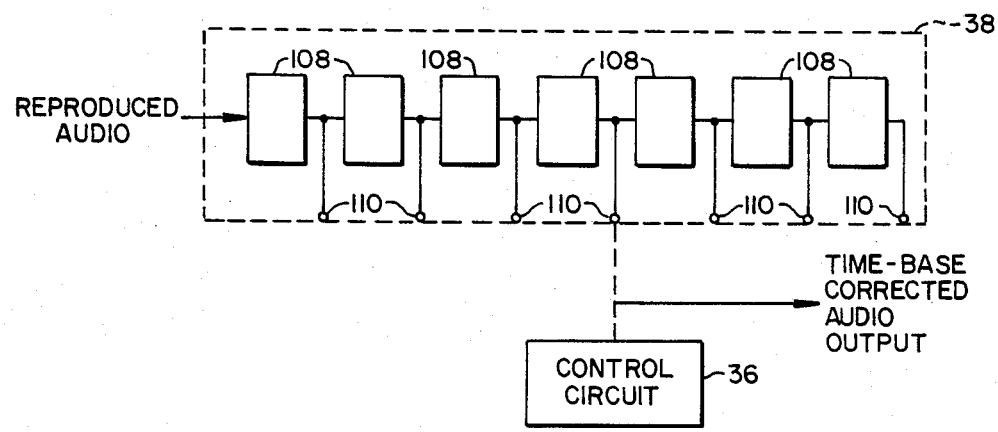
FIG._7.

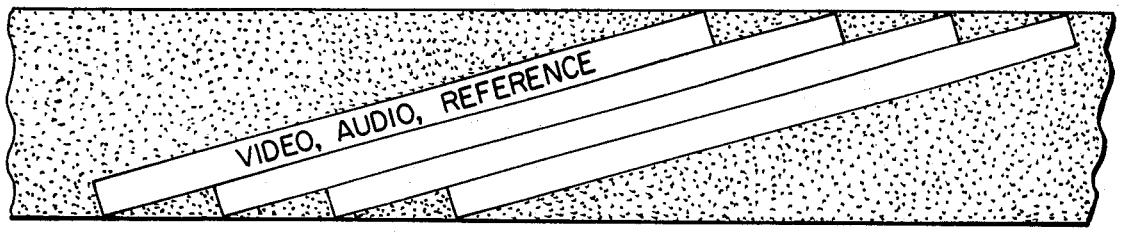
FIG._3A.
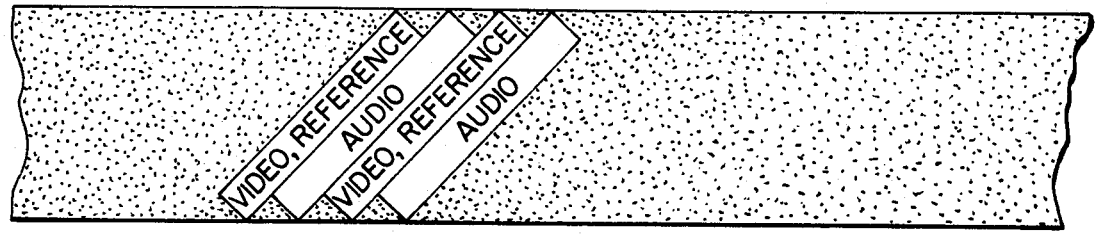
FIG._3B.
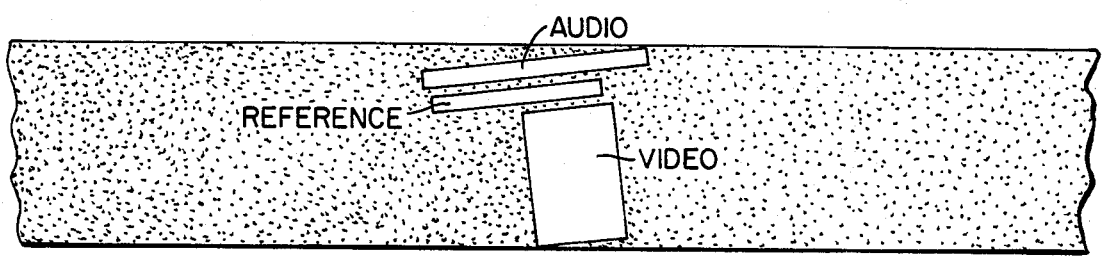
FIG._3C.
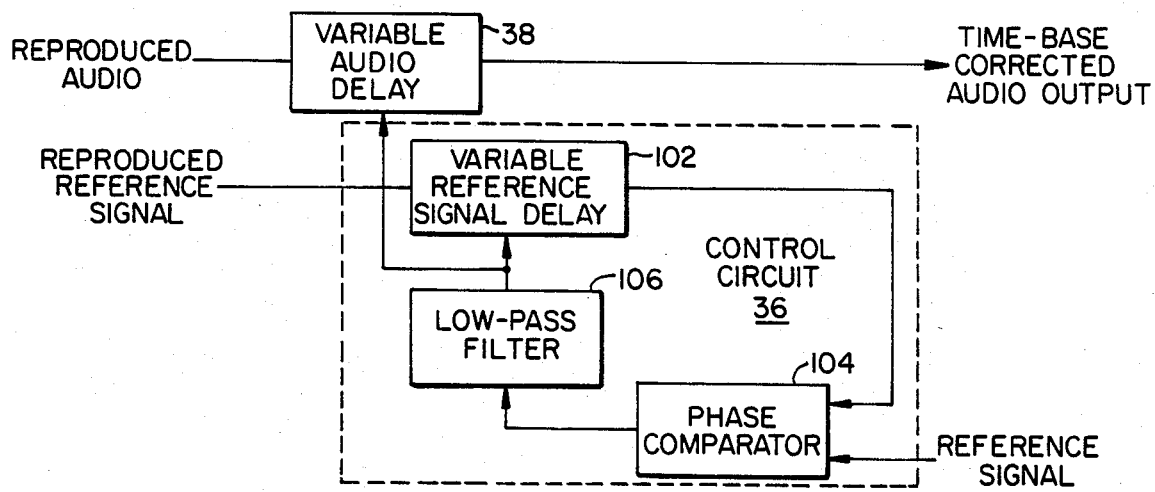
FIG._6.

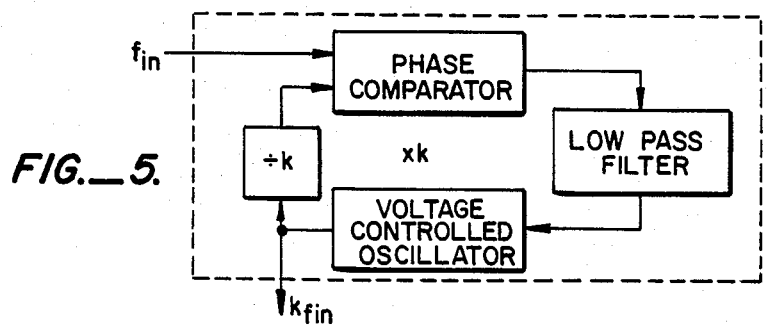
FIG._5.
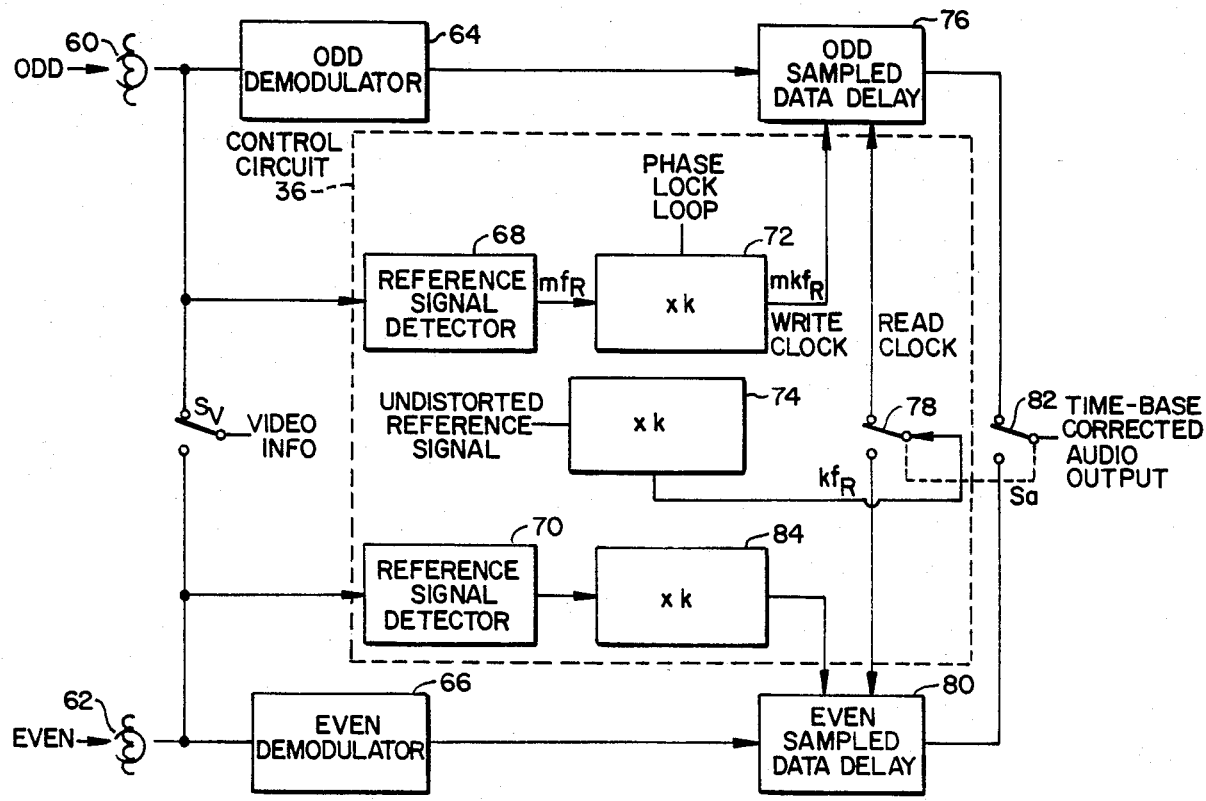
FIG._4.
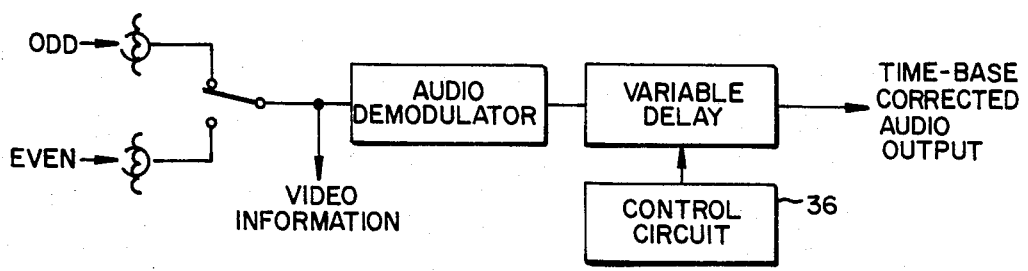
FIG._8.

TIME-BASE CORRECTION OF AUDIO SIGNALS IN VIDEO TAPE RECORDERS

BACKGROUND OF THE INVENTION

The present invention relates in general to video tape recorders and in particular to time-base correction of audio signals reproduced by video tape recorders.

In moving head video tape recorders, one or more magnetic heads carried by a rotating drum record tracks or segments on magnetic tapes with a high writing speed. Each track or segment represents a portion of the incoming television waveform. For example in the NTSC quadruplex format each track contains 16 television horizontal lines, while in typical helical scan formats each track contains one television field.

In the typical helical scan format the recording head is mounted on a drum. The video tape is wrapped around a part of the drum and is transported past the drum. The drum is rotated with respect to the tape in such an orientation that tracks on the tape that come in contact with the recording head and on which video information is recorded begin near one side of the tape and end near the other side. Such tracks are, however, at small angles to the length of the tape so that the tracks are almost parallel to the length of the tape. For example, in one commonly used format, the tracks are approximately 10 centimeters in length on the video tape which is half-inch wide. In other formats, that is, formats other than the helical scan, the tracks or segments may be at greater angles to the length of the tape. For example, the segments may be almost perpendicular to the length of the tape so that the length of the segments is substantially equal to the width of the tape.

In all moving head video formats, the orientation of the tape with respect to the drum, the position of the recording head on the drum, the transport speed of the tape and the speed of rotation of the drum must be quite precise. Thus, when a tape recorded by a moving head type video tape recorder is reproduced, the position of the playback head on the drum, the relative position of the drum with respect to the tape and the transport and rotation speeds of the tape and drum will affect the quality of the reproduced video information. Since the tracks or segments are recorded successively, they are reproduced also successively. To enable the playback head to accurately track the video segments on the tape, servo mechanisms have been employed. However, such mechanisms do not correct the time distortions of audio signals of the type explained below.

Because of the effects of temperature and humidity, or because a different machine is being used to reproduce the tape, the relative dimensions of the tape and the drum may be different from those applying during the recording. As a result, the information from each track will be slightly compressed or expanded in time compared with the original television waveform. When the reproduced signal is to be displayed on a television screen, this discrepancy between the original duration of each picture field and the reproduced duration does not affect the display, since during the visible part of the picture field the effect is merely a minor change in the horizontal dimension, and the time discontinuity occurs during the invisible field flyback period. In television studios it may be necessary to reproduce a television waveform with regular horizontal synchronizing pulses to permit mixing and cutting between sources. A time-base corrector may then be used to expand or compress each track's information in time to remove the discrepancies; such a procedure involves storage devices with a bandwidth equal to or greater than the television bandwidth, and is therefore only feasible in costly professional equipment.

In addition to the video, it is possible to record audio with the rotating heads using a modulated carrier technique. For example the format known as Betahifi employs a number of frequency-modulated carriers, accommodated in a region of the recorded spectrum between the luminance and the (color-under) chrominance. Both the video and audio information are fed to the same recording head and then recorded on the same track or segment on the video tape. Thus, in the Betahifi format the audio information is differentiated from the video information by being limited to different frequency ranges. In the VHS format, however, the audio and the video information may overlap in frequency. Instead, in the VHS format, two recording heads are used to record the video and audio signals separately. The recording head recording audio information generates a stronger magnetic field than the recording head recording video information so that the audio information resides in the portion of the tape away from the recording heads while the video information resides in a layer of the tape adjacent to the recording heads. In either format, however, the effects of temperature, humidity, different dimensions of tape and drum or a reproducing setting different from the recording setting affect the reproduction of audio information in the same manner as the reproduction of video information.

During reproduction each segment or track containing audio information will be compressed or expanded in time, so that successive segments of audio do not join together correctly; at the moment of switching from one track to the next, there will be a discontinuity in the output audio waveform. This discontinuity, at the beginning of each segment, must not be confused with any disturbance resulting from imperfect switching. In the unlikely event of no time compression or expansion, a switching disturbance may occur, but it is the result of imperfections in the circuitry. The disturbance resulting from time compression or expansion is inherent in the recording and reproduction process, and gives rise to a crackly buzz whose subjective level increases with increasing audio modulating frequency. This flaw in audio reproduction would clearly be eliminated by the application of a wideband time-base corrector which would expand or compress the time-scale for each track so that all the reproduced information, video and audio, is continuous through the track switching. It would also be possible to use time-base correction techniques to correct the timing of the audio carriers only before demodulation, but this would still require wideband circuits. Wideband time-base correctors are complex and expensive and are not feasible except for professional equipment such as those in television studios.

SUMMARY OF THE INVENTION

The system of this invention corrects the time base of audio signals reproduced from a video tape on which video signals, audio signals and a reference signal of known frequency have been recorded in consecutive or overlapping segments. Such signals are so recorded on the video tape that, upon reproduction, the audio signals and the reference signals are time distorted by substantially the same proportion. The system of this invention comprises a control means responsive to the reproduced reference signal for generating at least one control signal. The system of this invention further comprises a variable time-base correcting means responsive to the at least one control signal for processing the reproduced audio signals so that waveform discontinuities at the junction of the audio signal segments are substantially eliminated without also correcting the time-base of reproduced video signals.

BRIEF DESCRIPTION OF THE DRAWINGS

FIG. 1A is a schematic block diagram of a video and audio recording system recording audio and video information as well as a reference signal in odd and even tracks to illustrate the invention.

FIG. 1B is a schematic block diagram of a time-base corrector employed together with a signal reproducing system complementary to the recording system of FIG. 1A to illustrate the preferred embodiment of this invention.

FIG. 2A is a graph illustrating an input audio waveform to illustrate the preferred embodiment of this invention.

FIGS. 2B and 2C graphically illustrate the waveforms of output audio signals which have been compressed in time upon reproduction from odd and even segments of the input audio signal shown in FIG. 2A.

FIGS. 2D and 2E graphically illustrate the waveform of audio output signals which have been time-base corrected to illustrate the preferred embodiment of this invention.

FIGS. 3A, 3B and 3C are schematic views of video tapes showing the physical relationships between tracks recording video, audio and reference signals in which the reference signal and the audio signals have been subjected to substantially the same time compression or expansion to illustrate the preferred embodiment of this invention.

FIG. 4 is a schematic block diagram of a time-base corrector illustrating the preferred embodiment of this invention.

FIG. 5 is a schematic block diagram of a phase lock loop which may be employed in the preferred embodiment illustrated in FIG. 4.

FIG. 6 is a schematic block diagram of a time-base corrector illustrating an alternative embodiment of this invention.

FIG. 7 is a schematic block diagram of a variable delay circuit which may be employed in the alternative embodiment illustrated in FIG. 6.

FIG. 8 is a schematic block diagram of a time-base corrector employed together with a signal reproducing system. The circuit shown in FIG. 8 is a simplified version of the circuit of FIG. 1A where the time distortion to be corrected is always one of time compression.

DETAILED DESCRIPTION OF THE PREFERRED EMBODIMENT

FIG. 1A is a schematic block diagram of a video and audio recording system recording the audio and video information in odd and even tracks to illustrate the invention. The input audio waveform shown in FIG. 2A is fed at point a to the modulator 20 which produces an output in the form of a carrier modulated in some manner by the audio waveform. Such audio modulated carrier is added to the accompanying video information and to a reference signal by adder 22 and the audio and video signals are recorded on odd and even tracks of a video tape (not shown in FIG. 1A).

FIG. 1B is a schematic block diagram of a time-base corrector employed together with a signal reproducing system complementary to the recording system of FIG. 1A to illustrate the preferred embodiment of this invention. As explained above, the odd and even tracks on which the audio signals are recorded may be caused to expand or contract by humidity or temperature. The dimension of the drum during signal reproduction may also be different from that during recording. As a result of any one or a combination of such or other imperfections, the duration of an audio signal reproduced from the odd and even tracks of the video tape is longer or shorter than the duration of such signal when recorded. Thus, upon demodulation by demodulators 32,34 the waveforms of the output audio signals are time distorted—either expanded or compressed in time. FIGS. 2B and 2C graphically illustrate such distorted audio waveforms produced upon reproducing the audio input waveform of FIG. 2A. Points b and c in FIG. 1B are points in the signal reproducing system of FIG. 1B where such distorted output audio signals may be detected.

The reproduced signals from reproducing heads 28,30 are fed to a control circuit 36. The reproduced signals provided by reproducing heads 28,30 contain the reproduced reference signal which has been distorted. The reference signal is also fed to control circuit 36. The control circuit then provides at least one control signal to variable delays 38,40. Variable delays 38,40 then, in response to the control signal, process the distorted audio signals from points b and c to restore the waveforms to the time-base corrected forms shown in FIGS. 2D, 2E, respectively in a manner to be described below. Such time-base corrected waveforms appear at points d and e of FIG. 1B.

A comparison of the waveforms in FIGS. 2B, 2C, 2D and 2E will illustrate the advantages of this invention. If the odd and even output signals shown in FIGS. 2B and 2C are combined there will be a small gap Δ T between the odd and even signal outputs and also that the output signal shown in FIG. 2B ends at a level quite different from the level at which the signal in FIG. 2C begins. Such discontinuities produce a crackly buzz which becomes more annoying with increasing audio modulating frequency. The time-base corrected audio output signals shown in FIGS. 2D and 2E, however, are now substantially identical with corresponding segments of the input audio waveform shown in FIG. 2A and may be combined to regenerate the original waveform with no discontinuity.

The time-base corrector of FIG. 1B will operate as described above to correct the time-base of reproduced audio signals provided that the reference signal recorded with the audio and video signals are subjected to substantially the same time distortion as the audio signals. Thus, the reference signals may be recorded on the same track as the video and audio signals as shown in FIG. 3A. In fact the reference signal may comprise simply the horizontal synchronizing pulses typically recorded together with the video signals for scan triggering. Alternatively, the reference signal may be a pilot signal for guiding a playback head of a video tape recorder onto the signal track or segment to be reproduced. When the reference signal is recorded on the same track as the video and audio signals as shown in FIG. 3A, it will be evident that the reference signals are subjected to substantially the same time distortion as the audio signals.

In this connection, it is worthwhile to note that the audio signals on one hand and the video and reference signals on the other may be recorded on substantially the same track but by two different recording heads, one for the audio and the other for the video and reference signals. The track containing all three kinds of signals is then read by two corresponding playback heads to reproduce all three kinds of signals. This is, indeed, the recording and reproducing format of the VHS System. A comparison of the above description of the VHS System to the system of FIG. 1A will reveal that the VHS System does not follow that of FIG. 1A. Thus, the audio and video information and the reference signal are not added together before they are recorded as is the case in FIG. 1A. Since the VHS System reproduces the audio and video information by separate audio and video heads, the time-base corrector of FIG. 1B needs to be slightly modified for time-base correction in the VHS format. Such modified corrector is illustrated in FIG. 1C. As shown in FIG. 1C, audio signals reproduced at heads 28a, 30b are led to demodulators 32,34 while video and reference signals reproduced at 28b, 30a are fed to video information output and control circuit 36. The reference and audio signals recorded by a VHS System, being on the same track, are subjected to substantially the same time distortion so that the time-base corrector illustrated in FIG. 1C will operate in a manner similar to that of the corrector of FIG. 1B to correct the time-base of audio signals reproduced in the VHS format.

Alternatively, the audio and reference signals may be recorded on different but adjacent and substantially parallel tracks as shown in FIG. 3B. Since the corresponding audio and reference-video tracks are adjacent and substantially parallel to each other, they are affected in substantially the same manner by environmental factors such as humidity, temperature and imperfect reproducing environments. As in the case of FIG. 3A, the reference signal in FIG. 3B may be simply the horizontal synchronizing pulses accompanying most video signals. If the video, audio and reference signals are all recorded on separate tracks as illustrated in FIG. 3B, the time-base corrector of FIG. 1C will operate in substantially the same manner as described above to correct the time-base of the reproduced audio signals. As shown in FIG. 3C the lengths of audio and video tracks are substantially perpendicular to each other so that environmental factors causing an expansion of the audio track will cause the same degree of expansion of the substantially parallel reference track but not the video track. Conversely, environmental factors causing an expansion of the video track will not cause the same expansion of the audio or reference track. Therefore as long as the reference signals are recorded on a segment of the tape adjacent to and substantially parallel to the audio segment, the time-base corrector of FIG. 1C (except that three playback heads must be used one for each type of signal) will operate in a similar manner to correct the distortion of reproduced audio signals.

In the above discussion in reference to FIGS. 2B through 2E, the distortion of the audio signals is one of compression. It will be understood, however, that the time-base corrector of FIG. 1B will operate in substantially the same manner to correct the time-base of audio signals where the distortion ($-\Delta T$) is one of expansion. The recording and reproducing systems of FIGS. 1A and 1B record and reproduce the audio and video information in odd and even tracks. It will be understood that the time-base corrector of FIG. 1B is applicable even when the audio and video signals are not recorded or reproduced in odd-even formats.

FIG. 4 is a schematic block diagram illustrating the preferred embodiment of this invention. As shown in FIG. 4, odd and even reproducing heads 60 and 62 read the video and audio information from the video tape recorded in the odd- even format and provide the reproduced signals to odd and even demodulators 64,66 and reference signal detectors 68,70. Detectors 68 and 70 detect the reproduced reference signal and provide signals representative of the frequency of the reproduced reference signal to a sample data delay portion of the time-base corrector of FIG. 4 comprising, for the odd data signals, phase lock loops 72,74 and odd sampled data delay 76. If $f_R$ is the frequency of the reference signal recorded on the odd segments of the video tape and $mf_R$ represents the frequency of the reproduced reference signal with distortion factor m, the signal provided by detector 68 is proportional to $mf_R$. Phase lock loop 72 multiplies this signal by a factor k to provide write clock signals to odd sampled data delay 76 for sampling the reproduced audio signals. Phase lock loop 74 is provided with the reference signal $f_R$. It multiplies such frequency by the same factor k and provides read clock signals for sampling the reproduced audio signals written and stored in the sampled data delay 76. Audio signals are reproduced by reproducing head 60, demodulated by demodulator 64 and written and stored into the sampled data delay 76 upon being triggered by write clock signals from phase lock loop 72. A selected time delay after write lock signals are provided to delay 76 phase lock loop 74 provides read clock pulses to read the written and stored audio signals. Phase lock loop 74 is connected to delay 76 by switch 78 which alternately connects phase lock loop 74 to the odd sampled data delay 76 and even sampled data delay 80. Switches 78 and 82 are connected by connection Sa which causes switches 78 and 82 to be connected to the same sampled data delay. Therefore when phase lock loop 74 is connected to the odd sampled data delay 76 through switch 78, the odd sampled data delay 76 is connected to the audio output through switch 82. The odd sampled data delay 76 is triggered by read clock signals from phase lock loop 74 to provide the demodulated reproduced audio signals to the audio output.

The audio signal provided by sampled data delay 76 to the audio output is time-base corrected. To demonstrate that the audio signal read out of delay 76 is indeed time-base corrected, reference is now made to FIGS. 2A and 2B. For simplicity in explanation, each field period $T_0$ is 1/60 seconds which is the duration of a segment of recorded audio. The audio signals stored in delay 76 is read at the rate $kf_R$. In each field period (1/60 second), $kf_R/60$ samples are read out of delay 76. The reproduced audio signal is written into delay 76 at a clock frequency $mkf_R$. The segment of reproduced audio originally of duration 1/60 second now lasts for 1/60 m second so that the number of samples written per reproduced segment is $mkf_R \times 1/60m = kf_R/60$. This is the same number as is read out in time $T_o$ (1/60 second) at a constant rate $kf_R$ so that the effect is to compress or expand the reproduced audio segment so that it lasts exactly $T_0$, the same as its original duration during recording.

To avoid sampling of audio signals in delay 76 before the audio signals are written into the delay, the read clock signals from phase lock loop 74 are provided to delay 76 a selected time after phase lock loop 72 starts to provide write clock signals to delay 76, the selected time being chosen to allow for writing of audio signals into delay 76 and other transients. Since the audio signals written into delay 76 are read at the same time as the signals are written into the delay, the storage capacity of delay 76 need not be so large as to be sufficient to store the audio signal from an entire audio signal track or segment. In reference to FIGS. 2A and 2B, the distortion in the reproduced audio signal is measured by the time difference $\Delta T$. Delay 76 need only have sufficient storage to store audio signals written during the time $\Delta T$. In other words, the total available delay provided by delay 76 need not be a full period $T_0$ but must only be greater than the sum of the maximum value of $\Delta T$ for time expansion and the maximum value for time compression. For such reason the time-base corrector of the preferred embodiment described above costs much less than the wideband time-base correctors presently used in television studios. Furthermore, the time-base corrector of this invention is advantageous in that the audio signals are not sufficiently delayed relative to the picture to cause noticeable lack of synchronism between sound and picture.

For a typical helical scan recorder, $\Delta T$ may be of the order of 100 microseconds so that delay 76 must only provide a delay in such case greater than 100 microseconds. In such case, delay 76 may be built by low cost bucket-brigade or charge-coupled devices or by active or passive all-pass filter networks. In accordance with conventional sampling theory, k has a value such that the sampling frequency is equal to or greater than twice the highest frequency of the signal to be sampled. Preferably k has a value such that the sampling frequency is four times such highest frequency.

In a similar manner, the even audio segments read by reproducing head 62 are time-base corrected by detector 70 phase lock loops 84, 74 and even sampled data delay 80 as assisted by switches 78 and 82. Phase lock loop 72,74 and 84 may be of conventional construction such as that illustrated in FIG. 5.

FIG. 6 is a schematic block diagram of a time-base corrector illustrating an alternative embodiment of this invention. Instead of using a sampled data delay system as in the preferred embodiment, the control circuit 36 of the alternative embodiment as illustrated in FIG. 6 comprises a negative feedback circuit for correcting the time-base of the reference signal which applies the same correction to the audio signal. Circuit blocks having the same functions in FIG. 1B and FIG. 6 are labelled by the same numbers.

As shown in FIG. 6, the reproduced reference signal provided by either one of the two reproducing heads 28,30 of FIG. 1B is fed to variable reference signal delay 102 which, in the absence of any feedback, simply passes the same reference signal to phase comparator 104. The phase comparator 104 compares the phase of the reproduced reference signal to that of the reference signal and generates a signal proportional to the phase difference which is fed back to variable reference signal delay 102 through a low pass filter 106. The variable reference signal delay adjusts the phase of the reproduced reference signal in accordance with the sign and magnitude of the negative feed back and continues such adjustment until there is substantially no difference between the phase of the time-base corrected reproduced reference signal and the original reference signal. The negative feedback signal provided by phase comparator 104 is also provided to variable audio delay 38. Since the audio signals are time distorted in substantially the same manner as the reproduced reference signal, such negative feedback from phase comparator 104 will cause delay 38 to correct the time base of the reproduced audio signals. The time-base corrector illustrated in FIG. 6 does not, however, correct the timing of the associated video signals.

If the time distortion is one of time compression, the reference signal delay 102 may start with zero delay. But if the distortion is one of time expansion, the reference signal delay should start with an initial delay greater than $\Delta T$.

In the helical scan recorder two circuits similar to the control circuit 36 illustrated in FIG. 6 will be needed, one for odd fields and one for even fields. As stated above, the most common reference signal used associated with the video signals comprises horizontal synchronizing pulses.

The variable audio delay 38 of FIGS. 1B and 6 may be the conventional continuously variable type or it may be one in which the delay may be increased or decreased by finite discrete increments as illustrated by the delay circuit of FIG. 7. As shown in FIG. 7, the variable delay comprises a series of fixed delays where the control signal from control circuit 36 selects the number of fixed delays by selecting the proper tap in the series of taps 110. Thus, as the audio signal from an audio segment is read by one of the two reproducing heads of FIG. 1B, the audio signal reproduced from the segment is fed to variable audio delay 38. The amount of delay provided by variable delay 38 may change since the amount of time distortion may change within one audio segment. Thus, while the reproduced audio signal from the audio segment is fed to variable delay 38, the number of fixed delays which are applied to the reproduced audio signal may change depending on the control signal from control circuit 36. The number of fixed delays effective will only increase or decrease one at a time and will not jump by more than one. Therefore, as long as the increase of one fixed delay or a decrease of one fixed delay does not result in audible noise, the variable delay 38 of FIG. 7 will be just as effective as a continuously variable delay even though delay 38 of FIG. 7 varies the amount of delay in finite increments.

In all the embodiments described above, separate circuitry is required for odd and even fields because there is an equal probability that changes in tape dimension and/or drum dimension will result in time compression or expansion, and in the latter case the segments of reproduced audio will overlap in time. However, by minor alteration of the adjustment of the tape transport, it is possible to ensure that the discrepancy during reproduction always takes the form of time compression. For example, a slight reduction in tape tension in playback relative to recording will mean that a reproduced track is always slightly shorter than it was as it was recorded. If the error is always as shown in FIG. 2, correction requires the use of only one demodulator and one variable delay preceded by an "odd-even" switch. The reproducing part of FIG. 1B then reduces to FIG. 8.

The above description of method and the apparatus used is merely illustrative thereof and various changes in the details of the method and apparatus may be within the scope of the appended claims.

What is claimed is:

1. An apparatus for correcting the time base of audio signals reproduced from a video tape on which video signals, audio signals and a reference signal of known frequency have been recorded in consecutive or overlapping segments and wherein, upon reproduction, the audio signals and the reference signal are time distorted by substantially the same proportion, said apparatus comprising:

control means responsive to the reproduced reference signal for generating at least one control signal;

variable delay means responsive to said at least one control signal for processing the reproduced audio signals so that waveform discontinuities at the junctions of the audio signal segments are substantially eliminated without correcting the time-base of reproduced video signals.

2. The apparatus of claim 1 wherein the reference signal comprises horizontal synchronizing pulses of the video signal and wherein the video signals and audio signals have been time distorted substantially by the same proportion.

3. The apparatus of claim 1 wherein the reference signal is a pilot signal.

4. The apparatus of claim 3 wherein the pilot signal is provided for guiding a playback head of a video tape recorder onto the signal segment to be reproduced.

5. The apparatus of claim 1, wherein the variable delay means is a sampled data delay means, wherein the control means provides a first and second control signal to the sampled data delay means in the form of write and read clock pulses respectively, for sampling and writing and sampling and reading reproduced audio signals into and from the sampled data delay means, wherein the ratio of the frequency of the write clock pulses to that of the read clock pulses is substantially equal to the ratio of the frequency of the reproduced reference signal to the frequency of the reference signal, so that the audio signal sampled and read from the sampled data delay means is time-base corrected.

6. The apparatus of claim 1 wherein the control means comprises:

a second variable reference signal delay means for delaying the reproduced reference signal; and a phase comparator for comparing the delayed reproduced reference signal to the reference signal, said comparator capable of generating a feedback signal to the second variable delay means so that the amount of delay provided is proportional to the phase difference between the reproduced reference signal and the reference signal, thereby reducing said phase difference until the delay provided by the second variable delay means causes the delayed reproduced reference signal to become substantially equal to the reference signal, wherein the feedback signal is also supplied to the variable delay means as the control signal.

7. The apparatus of claim 1 wherein the audio, video and reference signals are recorded and reproduced by one head.

8. The apparatus of claim 1 wherein the audio signals are recorded and reproduced by a first head, and wherein the video and reference signals are recorded and reproduced by a second head.

9. The apparatus of claim 1 wherein the audio signals are recorded in segments separate from the segments in which the video and reference signals are recorded.

10. An apparatus for correcting the time base of audio signals reproduced from a video tape on which audio signals and video signals accompanied by horizontal synchronizing pulse signals have been recorded in consecutive or overlapping segments and wherein, upon reproduction, the audio and video signals including the horizontal synchronizing pulse signals are time distorted by substantially the same proportion, said apparatus comprising:

a sampled data delay means; and a control means for providing first and a second control signal to the sampled data delay means, wherein (i) the first control signal comprises write clock pulses for sampling and writing the sampled reproduced audio signal into the sampled data delay means at a frequency $mkf_H$ where $f_H$ is the frequency of the horizontal synchronizing pulses, $mf_H$ the frequency of the reproduced horizontal synchronizing pulses, and k a constant so selected that the frequency $mkf_H$ is at least twice that of the maximum frequency of the audio signal; and wherein (ii) the second control signal comprises read clock pulses for sampling and reading the stored audio signals in the sampled data delay means at a frequency $kf_H$, so that the audio signals so read are time-base corrected.

* * * * *